Jan. 4, 1966     W. C. FAHIE     3,227,141
WASTE HEAT RECOVERY SYSTEMS
Filed March 22, 1961
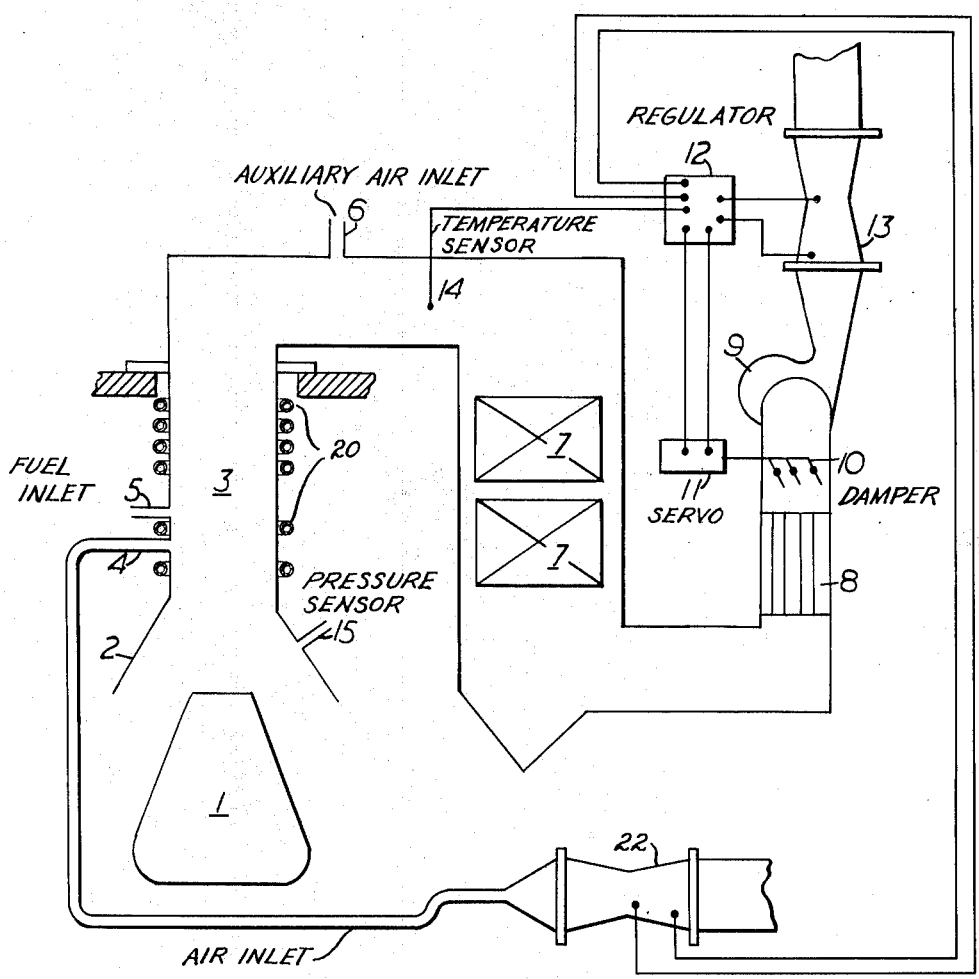
Inventor
William Cusack Fahie
By Dowell & Dowell
Attorneys United States Patent Office 3,227,141
Patented Jan. 4, 1966

3,227,141
WASTE HEAT RECOVERY SYSTEMS
William Cusack Fahie, Surrey, England, assignor to Reavell & Company Limited, Ipswich, Suffolk, England
Filed Mar. 22, 1961, Ser. No. 97,502
Claims priority, application Great Britain, Mar. 22, 1960, 10,130/60
4 Claims. (Cl. 122—7)

This invention relates to the automatic control of fume and waste heat recovery systems used in conjunction with steel converters and similar furnaces whose waste gases contain dust and fumes which must be removed to prevent atmospheric pollution.

The waste gases may contain considerable quantities of combustible constituents (some of which may in any case have to be burnt to render the waste gases non-toxic) and leave the converter at very high temperatures.

It is therefore ordinarily necessary to provide means for removing the dust and fumes, to introduce sufficient air to burn any combustible constituents and to recover the heat so generated together with the sensible heat of the gases leaving the converter by means of a waste heat steam boiler. In such systems it is normally difficult or impossible to provide a complete seal between the converter outlet and the inlet to the recovery plant, usually because part or all of the converter must be rotated or otherwise moved to permit charging and tapping. There is, in fact, usually a gap of considerable and indeterminate area between the converter mouth and the hood at the inlet end of the waste gas duct.

According to the present invention, a fume and waste heat recovery system of this kind is provided with automatic control equipment that includes a flow regulator for the waste gases operating in response to a signal representing the flow of the waste gases. The flow measurement is preferably made upon the cooled gases at the discharge end of the system. The regulator can operate either to maintain a constant gas flow at discharge, or to vary the flow in some desired way to suit varying operating conditions, for example in accordance with the quantity of oxygen supplied to the converter.

The above and other features of the invention will be apparent in the following description, given by way of example, of a system in accordance therewith, reference being had to the accompanying diagrammatic drawing.

The drawing shows the application of the invention in a recovery system associated with a steel converter. The waste gases issuing from the converter 1 pass into a hood 2 and upwards through a duct 3, the walls of which are provided with water tubes 20 forming part of a waste heat boiler. Additional air can be admitted at an entry 4 to localise combustion of any unburnt constituents of the waste gases. Additional fuel, with corresponding combustion air, can be admitted at an entry 5, if required, to maintain a minimum heat supply at times when there are no waste gases from the converter.

The waste gases next pass through banks of additional water tubes 7, and then a dust precipitator 8, and are discharged to atmosphere by an extractor fan 9. The fan output, and therefore the quantity of waste gas passing through the system, can be controlled by means of a damper 10.

It is obvious that unless such a system is carefully controlled, excessive quantities of air may be drawn in through the hood 2, lowering the temperature unduly, and at other times waste gas may escape out of the hood.

A known method of control is by means of an automatic regulator operating the damper 10 at the fan inlet and receiving its signal from the pressure at a connection point 15 to the inside of the hood. The regulator is adjusted to maintain a very small negative pressure at this point which will cause an inflow of air. This method is not in every way satisfactory since the waste gas flow from the converter outlet, and hence the air flow into the hood, are turbulent and the pressure signal is therefore subject to wide fluctuations. Furthermore, the location of a suitable position for the tapping point 15 presents difficulty. The present invention overcomes these shortcomings by substituting for the automatic control of the pressure within the hood, control of the flow of gas through the system.

The gases leaving the fan 9 will have been cooled by passing through the waste heat boiler and their temperature will be reasonably constant. It is therefore possible to measure flow changes with sufficient accuracy by means of the pressure difference set up by a venturi tube 13, or any equivalent measuring device, at the cooled gas discharge. This pressure difference is employed as the primary signal to a regulator 12 which operates the fan damper 10 through a servo mechanism 11.

The regulator 12 may be of the well known jet pipe relay type in which a pivoted jet, supplied with oil at a suitable pressure, impinges on a flat surface in which are two immediately adjacent orifices connected by pipes to opposite ends of a hydraulic cylinder i.e. the servomotor 11.

The oil jet is, as well known in the art, controlled by a diaphragm subjected to the differential pressures set up by the venturi 13 the corresponding force being balanced by an adjustable spring on the opposite side of the jet pipe. When the diaphragm and spring forces balance the jet pipe is in mid position the oil jet striking midway between the two orifices so that the oil pressure is the same on each. If a change of differential pressure deflects the jet pipe the oil pressure tends to rise at one orifice and fall at the other so that the piston of the hydraulic cylinder is set in motion operating the damper 10 in such a direction as to restore the differential pressure to its original value. The regulator can thereby maintain, within fairly close limits of accuracy, constant flow through the system. Since the flow of the gases leaving the converter is fairly constant during the operating period, and the inflow of supplementary air at the entry 4, and if required at a further entry 6, to reduce the temperature of the waste gases may be held constant without difficulty, it follows that the flow of air entering the hood 2 will also be approximately constant. Furthermore, should there be any appreciable in-leakage of air at any point after the hood, the total flow will still remain constant, the flow of air entering the hood being correspondingly decreased.

It is desirable to provide the regulator 12 with a secondary signal of the temperature at a point 14 so that should this temperature rise unduly, the regulator is re-adjusted to provide a greater flow, which implies that the quantity of air entering the hood will be increased. Correspondingly, if the temperature falls, the flow and hence the quantity of air entering will be reduced.

In cases where the supply of oxygen in any desired form is not constant during the operation, the control system described can be modified to maintain a waste gas flow proportional to the oxygen flow or alternatively varying in suitable relation to the oxygen flow. For example, the oxygen supply to the converter can be measured by use of an orifice plate, venturi or other devices, such as indicated at 22 a differential pressure signal being taken to the regulator which will be operated to maintain a waste gas flow proportional to the oxygen flow. This proportionality may, if desired, apply not to the whole waste gas flow but only to that portion of the flow in excess of a selected constant minimum gas mass flow that is independent of the oxygen quantity.

I claim:

1. A waste heat recovery system comprising,
    (a) a duct operable to convey waste gases from a combustion process to atmosphere;
    (b) means for introducing sufficient air into said duct to react with the combustible constituents of said waste gases;
    (c) a waste heat boiler operable to combine said waste gases and said introduced air provided by said introducing means for burning said combustible constituents;
    (d) heat exchanger means positioned in said duct for removing heat generated by said waste heat boiler;
    (e) measuring means positioned in said duct for generating a signal indicative of flow rate changes of said waste gases; and
    (f) control means responsive to said signal for maintaining said flow rate of said waste gases at a predetermined value.

2. The system of claim 1 including further introducing means for adding fuel within said duct during the absence of any of said combustible constituents.

3. The system of claim 1 wherein said measuring means is a venturi tube.

4. The system of claim 1 wherein said control means is further responsive to the temperature of said waste gases upstream of said heat exchanger means and operative to modify said flow rate in accordance with said temperature.

References Cited by the Examiner

UNITED STATES PATENTS

| | | | |
|---|---|---|---|
| 2,184,647 | 12/1939 | Lane | 236—14 |
| 2,202,793 | 5/1940 | Hagan | 110—162 |
| 2,252,368 | 8/1941 | Germer | 236—14 |
| 2,349,329 | 5/1944 | Anderson | 236—15 |
| 2,831,467 | 4/1958 | Guczky | 122—7 |
| 2,984,984 | 5/1961 | Dickey | 122—479 |

FREDERICK L. MATTESON, Jr., *Primary Examiner.*

FREDERICK KETTERER, PERCY L. PATRICK, ROBERT A. O'LEARY, *Examiners.*